(12) United States Patent
Kerofsky

(10) Patent No.: US 7,003,153 B1
(45) Date of Patent: Feb. 21, 2006

(54) VIDEO CONTRAST ENHANCEMENT THROUGH PARTIAL HISTOGRAM EQUALIZATION

(75) Inventor: Louis Joseph Kerofsky, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 521 days.

(21) Appl. No.: 09/676,523

(22) Filed: Sep. 29, 2000

(51) Int. Cl.
*G06K 9/00* (2006.01)
(52) U.S. Cl. ....................... 382/168; 382/254
(58) Field of Classification Search ........ 382/168–172, 382/162, 165, 254, 274, 275; 348/670–682, 348/699–700
See application file for complete search history.

(56) References Cited

U.S. PATENT DOCUMENTS

| | | | | |
|---|---|---|---|---|
| 4,742,557 A | * | 5/1988 | Ma ........................... | 382/172 |
| 5,339,368 A | * | 8/1994 | Higgins-Luthman et al. .... | 382/169 |
| 5,410,617 A | * | 4/1995 | Kidd et al. .................. | 382/169 |
| 5,808,697 A | * | 9/1998 | Fujimura et al. ............ | 348/672 |
| 5,982,926 A | * | 11/1999 | Kuo et al. ................... | 382/167 |
| 5,999,639 A | * | 12/1999 | Rogers et al. .............. | 382/132 |
| 6,148,103 A | * | 11/2000 | Nenonen ..................... | 382/169 |
| 6,236,751 B1 | * | 5/2001 | Farrell ........................ | 382/168 |
| 6,463,173 B1 | * | 10/2002 | Tretter ........................ | 382/168 |
| 6,664,973 B1 | * | 12/2003 | Iwamoto et al. ............ | 345/589 |

* cited by examiner

*Primary Examiner*—Joseph Mancuso
*Assistant Examiner*—Ishrat Sherali
(74) *Attorney, Agent, or Firm*—Marger Johnson & McCollom, P.C.

(57) ABSTRACT

Methods and apparatus for video contrast enhancement are disclosed. A pixel level threshold is set for an input video frame in a video sequence. For pixel levels in the input video frame that are below the threshold, an adaptive contrast-enhancing function is applied. For other pixel levels, a scene-stable mapping function is applied.

This contrast enhancement method can improve the contrast in darker areas of a scene depicted in the video sequence, without destroying the intended light levels for a scene or causing temporal brightness fluctuations in the enhanced video sequence.

23 Claims, 11 Drawing Sheets

*, ^ Each Implementation Has at Least One of These Two Options

VIDEO CONTRAST ENHANCEMENT THROUGH PARTIAL HISTOGRAM EQUALIZATION

FIELD OF THE INVENTION

This present invention relates to video contrast enhancement, and more particularly to a method and apparatus for enhancing video contrast via partial histogram equalization.

BACKGROUND OF THE INVENTION

A digital image represents a visual scene as an array of pixels. Each pixel stores the image intensity level for a specific point in the visual scene. For example, in a black-and-white digital image, each pixel may contain an 8-bit value that expresses a luminance level as a number between 0 and 255, with 0 representing black and 255 representing white. In a color digital image, each pixel may have multiple components or color planes, each component representing the intensity level for a "color" (e.g., RGB (Red-Green-Blue) or CMY (Cyan-Magenta-Yellow) color planes) or a luminance/chrominance value.

Many digital images are captured in such a way that the dynamic range available in the pixel format is underutilized. For instance, in a given 8-bit image, most of the image intensity information may cluster in a small sub-range of the available 0-to-255 range. This results in a displayable image with many image features that cannot be readily discerned by a human viewer, as the contrast sensitivity function (CSF) of the human visual system cannot resolve such small differences in image intensity level.

Fine-contrast features in a digital image can be made more discernable by application of a contrast-enhancement algorithm known as histogram equalization (a histogram indicates the relative occurrence of each possible pixel value in a particular digital image—the magnitude of each bin in the histogram represents the frequency of occurrence of a corresponding pixel value). A short description of histogram equalization (HE) follows.

FIG. 1 shows a hypothetical histogram H(x) for an input image (actual histograms are rarely smooth functions as shown, and are often multimodal). Although the dynamic range of the pixel format allows for intensity levels x between 0 and L-1, H(x) indicates that the hypothetical image only occupies values between $x_{MIN}$ and $x_{MAX}$.

Histogram equalization attempts to redistribute the various image intensity levels to new levels so that the histogram E(y) of the output image better approximates a uniform distribution over the entire range 0 to L-1. A remapping function y=F(x) is calculated such that $$E(y)=E(F(x))=H(F^{-1}(y))$$

approximates such a uniform distribution. Although E(y) in FIG. 1 is shown as perfectly uniform, it is noted that with quantized data as exists in histogram bins, HE will usually not result in L bins with an equal number of pixels in each. Nevertheless, the HE algorithm distributes the quantized data in as uniform of a manner as is possible (see FIG. 14 for actual examples).

With a near-symmetric distribution such as H(x), the mean of the distribution $x_M$ will map approximately to the level L/2 in E(y). When the distribution is not symmetric, the specific location that $x_M$ will map to depends on how the histogram is skewed. These characteristics of HE can cause problems when HE is applied to a video sequence—although each output frame may have excellent contrast, the mean value is not preserved. Thus a histogram-equalized video sequence may have undesirable image flicker artifacts. Also, since the mean may change significantly, scenes which are intended to be dark (or bright) may no longer appear so.

One researcher has proposed a different HE scheme to combat the problems inherent in applying classical histogram equalization to a video sequence. "Contrast Enhancement Using Brightness Preserving Bi-Histogram Equalization", Y.-T. Kim, *IEEE Transactions on Consumer Electronics*, Vol. 43, No. 1, February 1997; see also Kim & Cho, "Image Enhancing Method Using Mean-Separate Histogram Equalization and a Circuit Therefor", U.S. Pat. No. 5,963,665, Oct. 5, 1999.

Referring to FIG. 2, the intended operation of Kim's method is illustrated. Kim calculates the mean intensity level $x_M$ for the input image. Kim then ensures that $x_M$ maps to itself in the output image by dividing the image into two groups of pixels, those above $x_M$ and those below this value. Each group is then histogram-equalized separately, i.e., the lower group of pixels is equalized over the range 0 to $x_M$, and the upper group of pixels is equalized over the range $x_M$ to L-1. This results in an output histogram approximately represented by B(y) in FIG. 2. Kim notes that for a symmetric distribution H(x), the mean output intensity achieved with his mapping is $(x_M+L/2)/2$, i.e., the mean shifts halfway towards the middle intensity, instead of all the way to the middle intensity like in classical HE. Kim claims that this results in less brightness shifting over an image sequence. The Kim approach will be referred to herein as BBHE (Brightness-preserving Bi-Histogram Equalization).

It is recognized herein that BBHE can still produce undesirable artifacts when applied to a video sequence. One problem with BBHE is that many different image distributions can have the same mean. Particularly when these distributions are multi-modal, some regions of the image may experience drastic shifts in intensity even though the mean intensity is preserved. Another problem is that the mean statistic is extremely sensitive to outliers, i.e., a relatively few pixels with intensities located far from the mean can have a profound influence on mean intensity. Thus when the histogram is not symmetric about the image mean, large shifts in mean brightness can still occur, and substantial brightness shifts can still occur for some ranges of pixel values.

These effects are illustrated by the simplified bimodal distributions of FIGS. 3 and 4. In FIG. 3, the input histogram is divided into two modes; mode 20 contains 25% of the pixels, and is uniformly distributed over a range 0 to 0.2 L. Mode 22 contains the other 75% of the pixels, and is uniformly distributed over a range 0.25 L to 0.35 L. The input image mean $x_M$=0.25 L. With this input, BBHE produces a result equivalent to that produced with mapping function 24, and the output histogram is (somewhat coincidentally) a uniform distribution 26. Note that the mean level has shifted all the way up to L/2, i.e., it has doubled. And mode 22, which contains 75% of the pixels, has been spread by a factor of 7.5.

Now compare this result with FIG. 4, which has the same mean $x_M$=0.25 L. In FIG. 4, the input histogram is also divided into two modes; mode 28 contains ⅚ths of the pixels, and is uniformly distributed over a range 0.05 L to 0.2 L. Mode 30 contains the remaining ⅙ of the pixels, and is uniformly distributed over a range 0.75 L to L. When BBHE is applied to this input, distribution 34 results, and the mean level has shifted down to ~0.208 L. Mode 30, which represented very bright pixels in the scene, has been shifted such that some of its pixels now appear very dark. These simple examples show that with BBHE, the input scene, as well as the average brightness, can at the BBHE output change significantly and in many different ways, even though the input mean value is stabilized.

SUMMARY OF THE INVENTION

The present disclosure proposes a novel contrast enhancement approach that is particularly applicable to video sequences. This approach is based on several underlying observations (although a particular embodiment of the invention may not utilize each of these principles). First, it is assumed that the video was captured at the desired mean intensity and that the primary objects in the scene are generally visible. If this assumption is not correct, a scene-constant brightness adjustment is an appropriate way to deal with this situation—thus, frame-adaptive video contrast enhancement is typically not the best place to be performing large intensity shifts on large numbers of pixels. Second, the mean intensity is generally not a preferred metric for determining how an image should be equalized, as is evident from the discussion in the section above. From these principles, it is proposed that flicker artifacts can be controlled by limiting equalization to one or two subranges of pixel intensities, preferably at the darkest and lightest subranges of histogram levels, and by limiting the extent to which these pixel intensities can be remapped to include, respectively, the darkest and lightest histogram subranges. Although this approach may not provide the best contrast enhancement possible for each frame considered individually, it can provide good contrast enhancement without noticeable temporal intensity artifacts or lighting distortion.

In one aspect of the present invention, a method of video contrast enhancement is disclosed. A first pixel level threshold is set for an input video frame in a video sequence. When a given input-video-frame pixel's level is below the pixel level threshold, that pixel is remapped according to an adaptive contrast-enhancing function. When the given input-video-frame pixel's level is above the pixel level threshold, that pixel is instead remapped according to a scene-stable mapping function.

Preferably, the threshold is either fixed during the scene, or is based on a percentage of pixels, e.g., the histogram bin below which x % of the pixels fall. Also preferably, the adaptive contrast function maps an input histogram for values below this threshold to a new target histogram.

Alternately, the method can be applied to high-intensity levels instead of low-intensity levels, i.e., the method can be reversed about the threshold. And the method can be applied to enhance contrast below a lower threshold and above an upper threshold, while applying the scene-stable mapping function to pixels having intensities lying between the two thresholds.

Although the method is straightforward enough to be implemented in hardware, software implementations are also envisioned. Therefore, the disclosed methods can also be embodied in an apparatus comprising a computer-readable medium containing computer instructions that, when executed, cause a processor or multiple communicating processors to perform a method for video contrast enhancement.

In another aspect of the invention, a video contrast enhancer is disclosed. The contrast enhancer comprises a contrast-enhancing function generator capable of accepting a target histogram specification and a set of histogram bins derived from one or more frames of a video sequence. The set of histogram bins represent a histogram at least for pixel levels below a selected pixel level threshold. The function generator is capable of generating a remapping function for input pixel levels below the threshold based on the target histogram specification and the set of histogram bins. The contrast enhancer further comprises a scene-stable mapper to control the remapping function for input pixel levels above the threshold.

In yet another aspect of the invention, a digital video device is disclosed. The device comprises a partial-histogram contrast enhancer to accept a digital video frame sequence and remap the pixel levels in each frame. The remapping conforms a histogram derived from the frame sequence to a new histogram specification for pixel levels below a first pixel level threshold. The device also has means for setting the first pixel level threshold, and means for enabling the partial-histogram contrast enhancer. In other respects, the digital video device can be constructed as a conventional digital video device, e.g., a digital video camera, an analog-to-digital video transfer device, a digital video editing device, a digital video compressor, a digital video decompressor, a digital video receiver, a digital video playback device, or a digital video display device. The histograms used by the contrast enhancer can be calculated within the device, or supplied, e.g., as part of the digital video frame sequence.

BRIEF DESCRIPTION OF THE DRAWING

The invention may be best understood by reading the disclosure with reference to the drawing, wherein.

DETAILED DESCRIPTION OF THE PREFERRED EMBODIMENTS

Several terms have been assigned particular meanings within the context of this disclosure. As used herein, the terms "above" and "below" a threshold are used with the recognition that, with integer comparisons, something is often defined to be "above" (or alternately, "below") a threshold if it equals that threshold. A "contrast-enhancing function" redistributes a set of pixel intensities in a nonlinear manner that increases the average contrast between neighboring intensities. A "function" can be a closed form equation, but a discrete function can also be implemented using, e.g., a lookup table. An "adaptive" function changes as scene content changes, although it need not change at every frame, and the response to scene content changes can be delayed or filtered. On the other hand, a "scene-stable" function remains substantially constant for the duration of a video scene (or longer); if such a function does change substantially, it does so at scene transitions or very gradually.

"Histogram specification" is a process of mapping one histogram to generally fit the shape of a target histogram—"histogram equalization" is a special case of histogram specification, where the target histogram is a uniform distribution. The bins of a histogram need not be expressed in any particular units, although percentages and raw number of pixels are common units. Likewise, a histogram can be either discrete or cumulative. The bins need not map 1:1 to pixel intensities either; for example, a histogram bin may map to only the top six bits of an eight-bit intensity.

Figure 1:
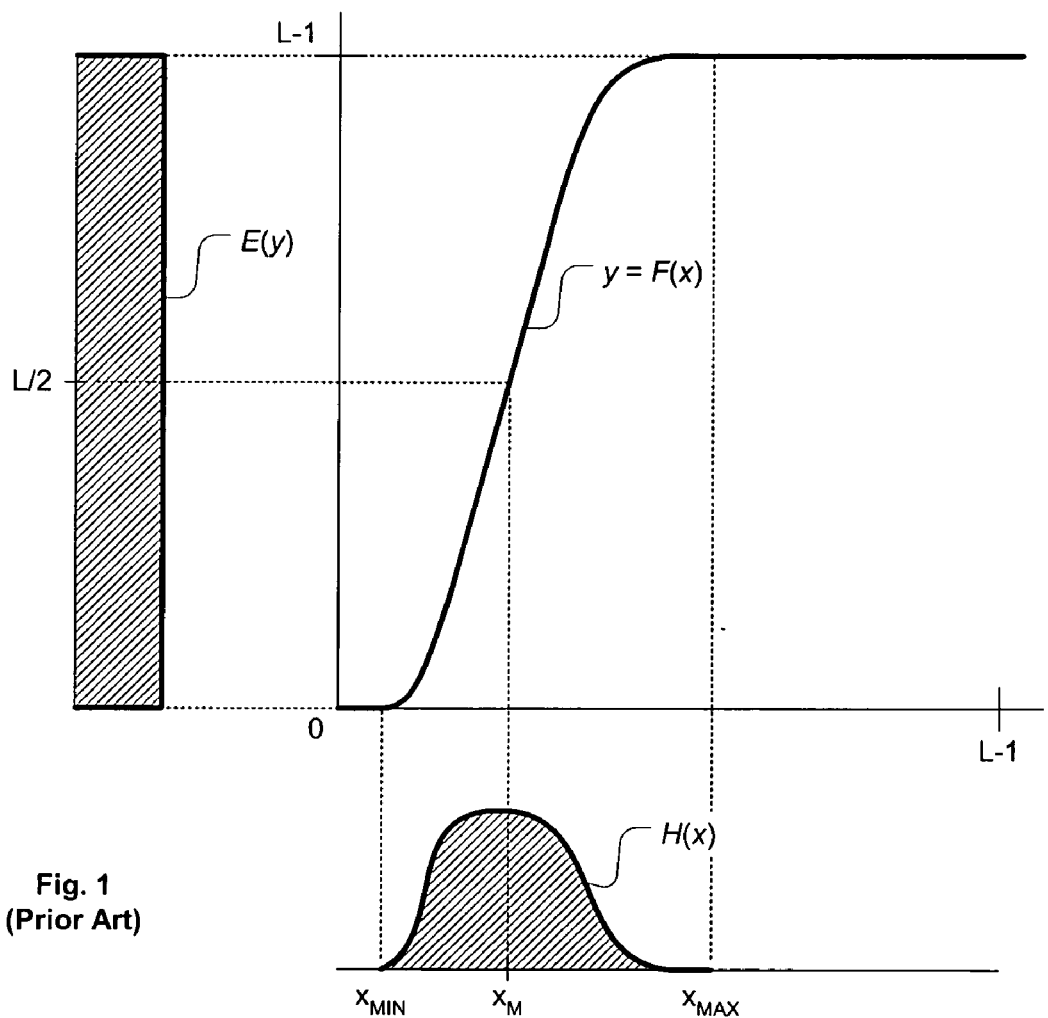
FIGS. 1 and 2 illustrate prior art approaches to contrast enhancement.
Figure 2:
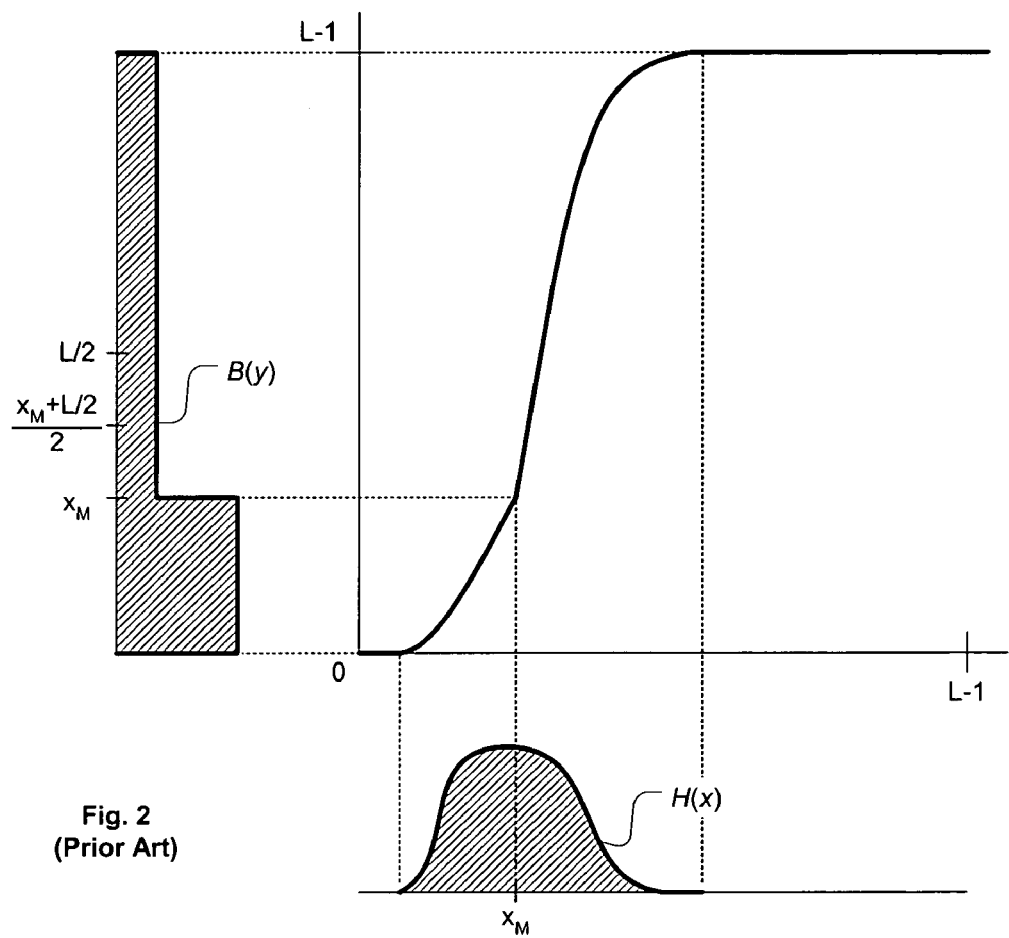
Figure 3:
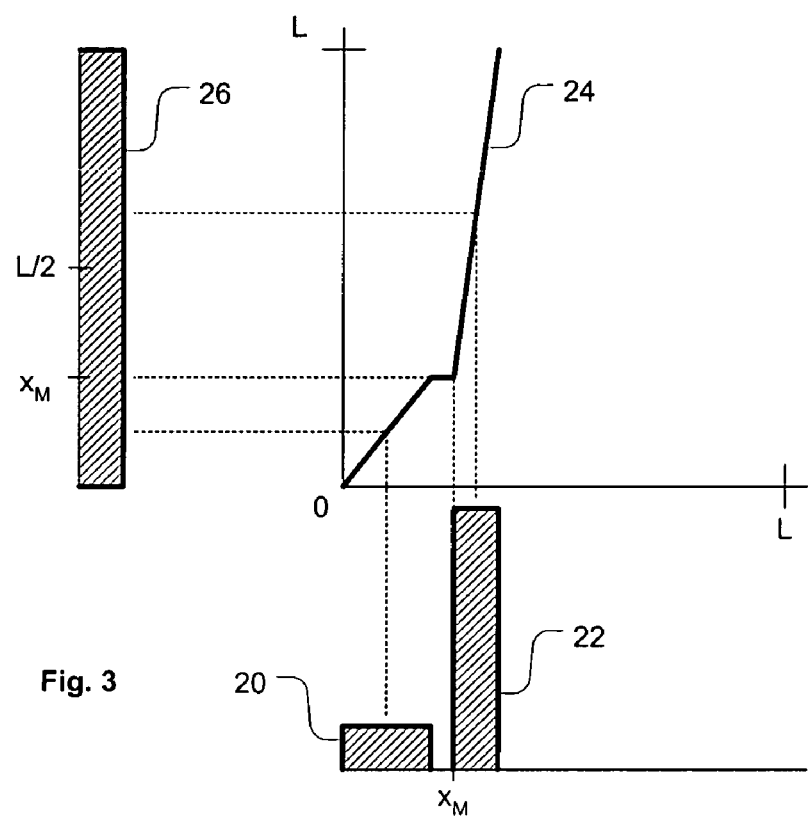
FIGS. 3 and 4 illustrate mapping characteristics of the prior art BBHE approach.
Figure 4:
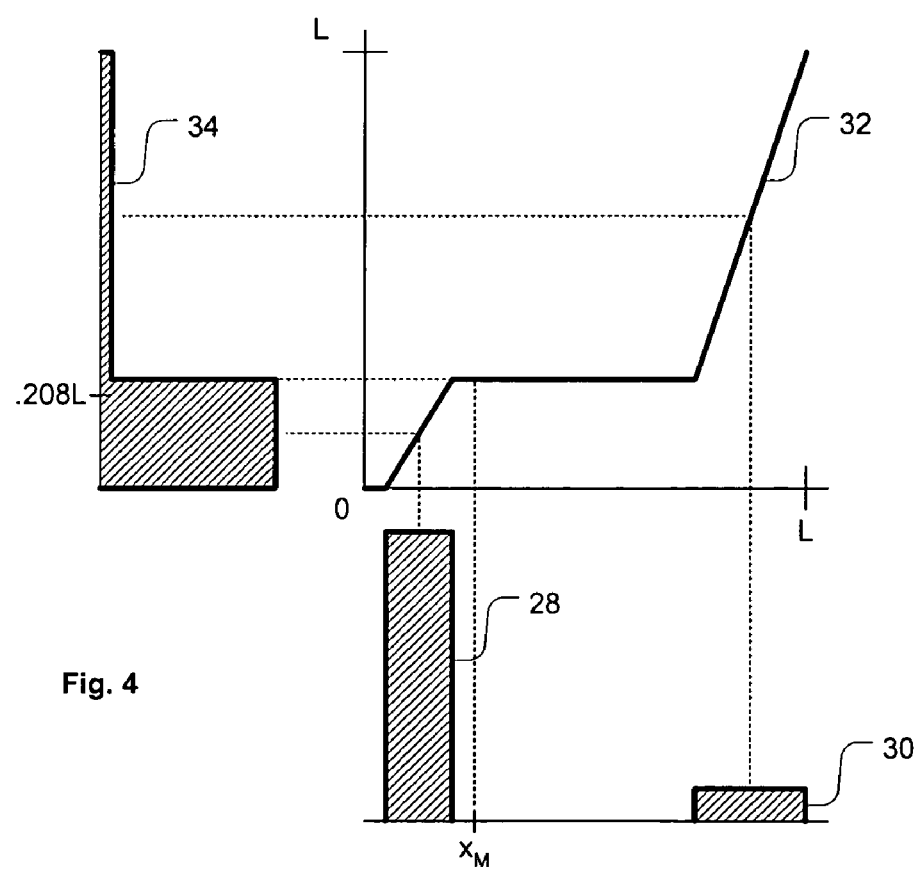
Figure 5:
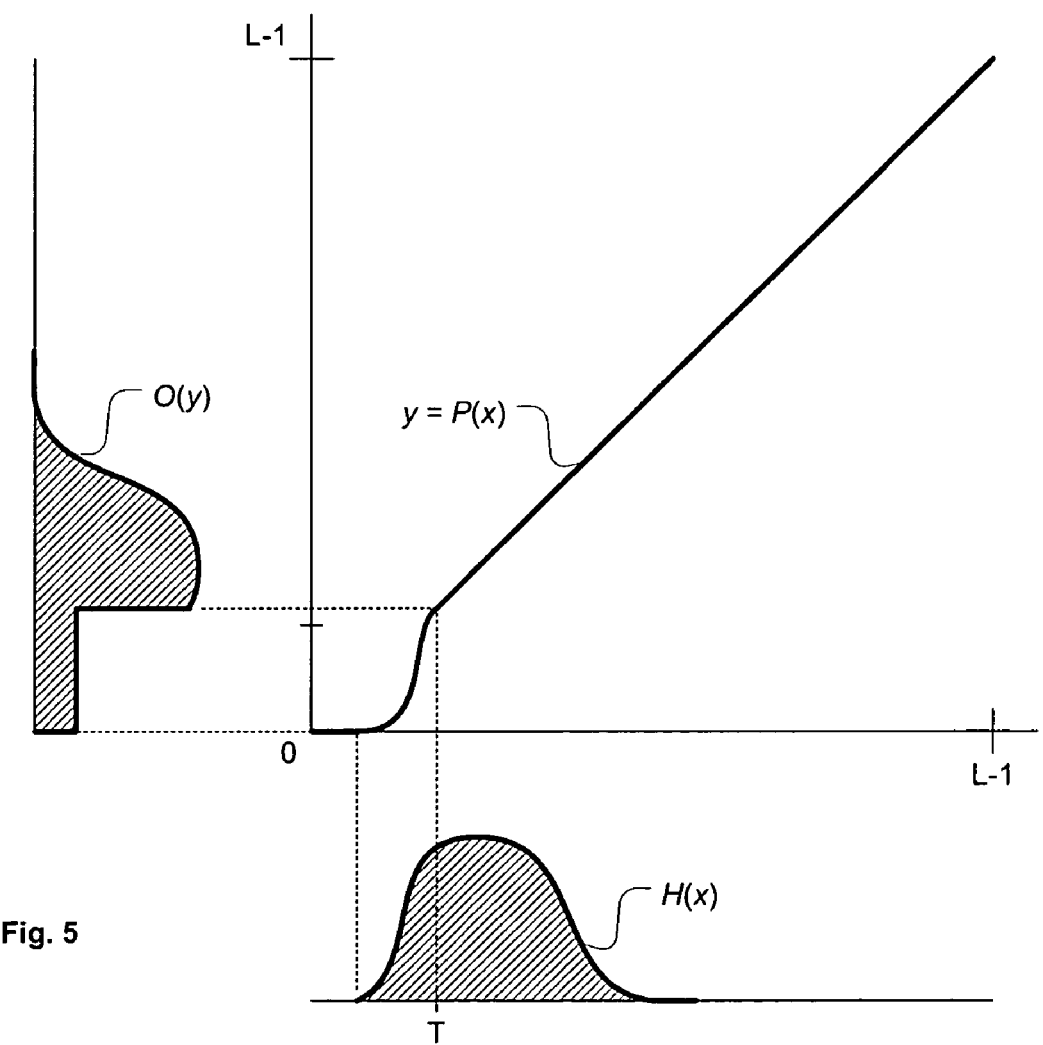
FIGS. 5 and 6 illustrate contrast-enhancement mapping according to two embodiments of the invention.

A first embodiment will now be described with reference to FIG. 5. FIG. 5 shows the same input histogram H(x) as used in the illustrations of FIGS. 1 and 2. A threshold T is fixed at a selected input value, e.g., L/4. The combined function y P(x) defines the desired mapping from H(x) to O(y). Below T, P(x) comprises a contrast-enhancing function such as HE (illustrated) applied over the same range of output pixels. Above T, P(x)=x, hence output histogram O(y)=H(x) for x>T.

This embodiment has several generally advantageous features. First, note that intensity remapping is limited to a range at the tail of the overall intensity range. This prevents intended lighting levels from being distorted unnaturally, e.g., light areas appearing dark and vice-versa. Second, the range is based on a stable statistic that is not scene-dependent. This means that even if the histogram distribution changes dramatically over a progression of frames, the enhanced range remains stable.

Figure 6:
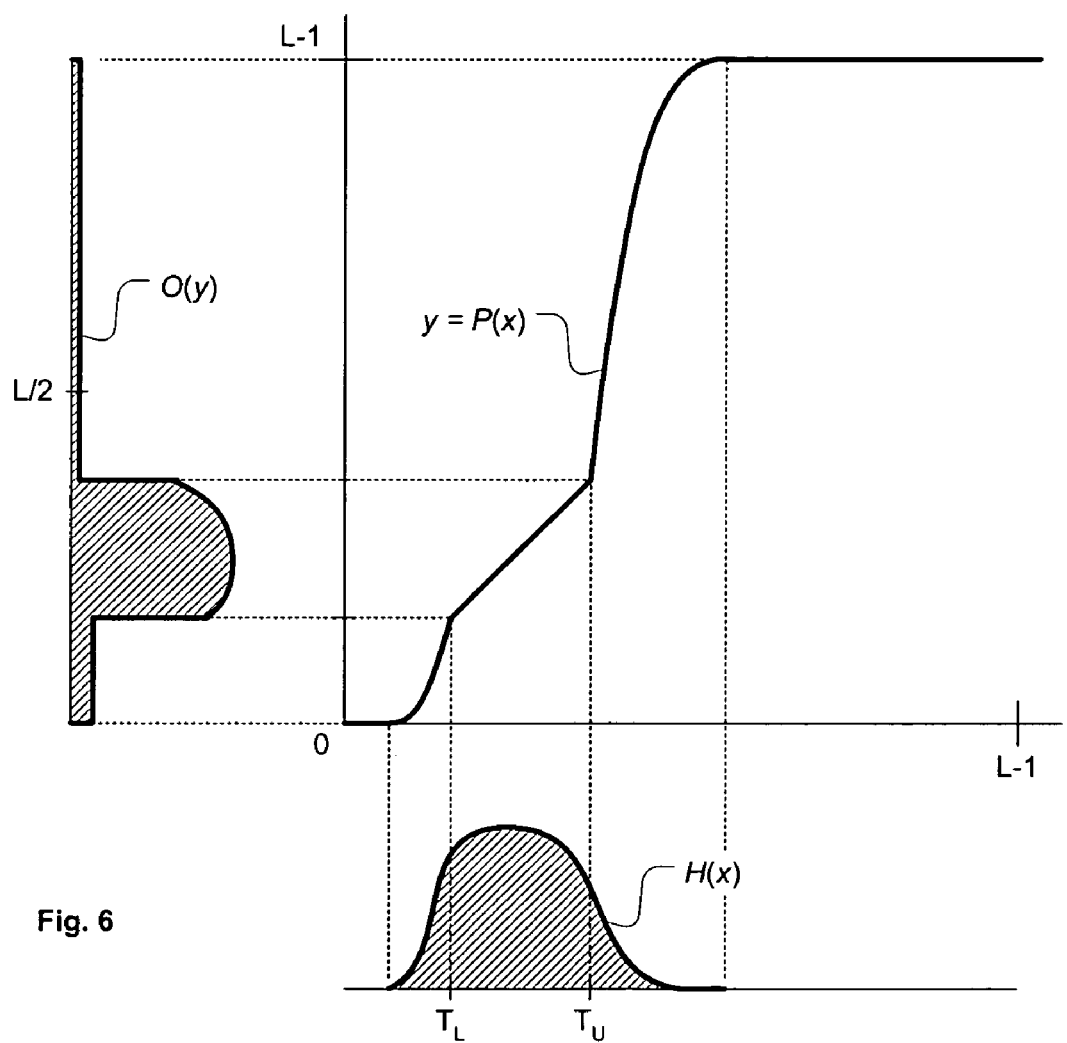

A second possible embodiment is depicted in FIG. 6. Two thresholds, $T_L$ and $T_U$, are based on a percentage of histogram pixels. For instance, $T_L$ can be set so that 10% of the pixels fall in a lower tail, and $T_U$ can be set so that 10% of the pixels fall in an upper tail. A contrast-enhancing function is applied to each tail, while the middle 80% of the pixels are linearly mapped.

This embodiment preserves the majority of pixel intensities as-input, again relegating changes to the tails of H(x). FIGS. 5 and 6 can be combined in several ways—for instance, two fixed thresholds can be used, or a percentage threshold can be used on one tail only. A percentage threshold can also be used, but clamped to not exceed a fixed threshold. For instance, if $T_{0.9}$ represents the histogram bin x below which 90% of the pixels lie, and $T_{UF}$ represents a minimum value for the upper threshold $T_U$ (e.g., 3 L/4), the threshold can be set such that $T_U = \max(T_{0.9}, T_{UF})$.

Figure 7:
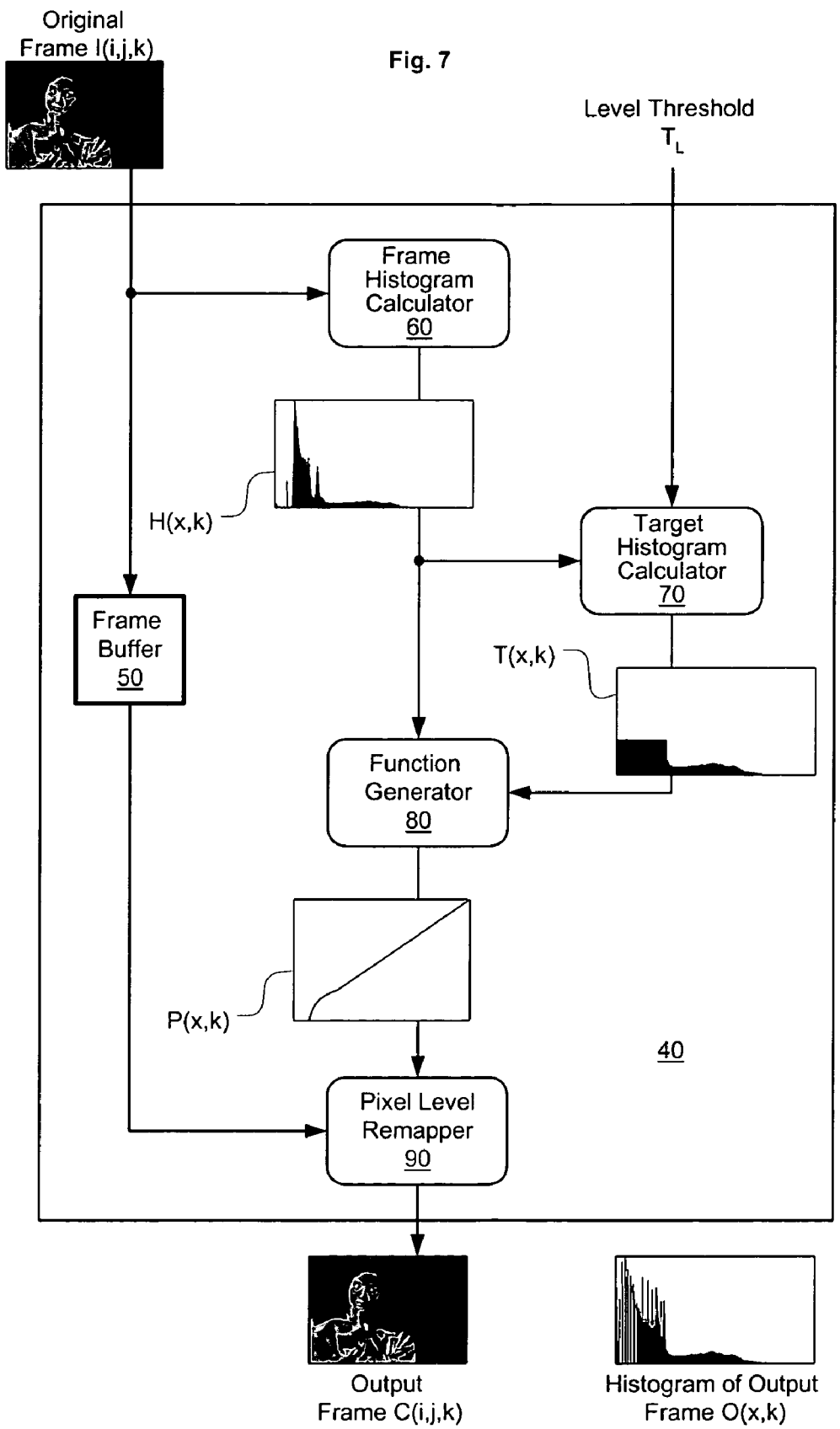
FIG. 7 shows a block diagram for a video contrast enhancer according to an embodiment of the invention.

Embodiments such as those described above can be implemented with a video frame processing device such as device 40 of FIG. 7. Device 40 is depicted in block diagram form. An N×M rectangular input frame I(i,j,k) is supplied to frame buffer 50 and frame histogram calculator 60, where i designates a row between 0 and N−1, j designates a column between 0 and M−1, and k designates a frame-identifying sequence number. Frame buffer 50 holds the frame until a remapping function P(x,k) is ready for that frame.

Frame histogram calculator 60 calculates a histogram H(x,k) for that frame. For instance, calculator 60 can perform the equivalent of the following operations upon receiving a frame k:

```
for (i = 0; i <= MaxLevel; i++)
    Hist[i] = 0;
for (i = 0; i < N; i++)
{
    for (j = 0; j < M; j++)
        ++Hist[I[i][j]];
}
```

Calculator 60 supplies histogram H(x,k) to target histogram calculator 70 and function generator 80. Target histogram calculator 70 also receives a level threshold $T_L$ and a histogram specification for the portion of H(x,k) to be contrast-enhanced. Calculator 70 calculates a target histogram T(x,k) from these values. For instance, calculator 70 can perform the equivalent of the following operations, upon receiving a frame k, in order to implement a uniform histogram specification:

for (i=0; i<T; i++)
    SumHist+=Hist[i];
SumHist/=T;
for (i=0; i<T; i++)
    Target[i]=SumHist;
for (; i<=MaxLevel; i++)
    Target[i]=Hist[i];

These operations count the number of pixels that have an intensity less than $T_L$ and divide this count by the number of bins that exist below the threshold. This figure represents a uniform number of pixels, that, when distributed in each bin below the threshold, equals (approximately for integer arithmetic) the number of pixels that are to be equalized. For bin values above the threshold, the frame histogram bin value is copied to the target histogram bin, indicating that remapping is generally not desired for these pixels.

Function generator 80 calculates a remapping function P(x,k) based on H(x,k) and T(x,k). For instance, the following calculations produce a lookup table Remap[ ] that expresses a remapping function that maps H(x,k) approximately to T(x,k):
SumTarget=Target[0];
SumHist=0;
for (i=j=0; i<=MaxLevel; i++)

```
{
    SumHist += Hist [i];
    while ((SumHist > SumTarget)&&(j < MaxLevel))
        SumTarget += Target[++j];
    Remap[i] = j;
}
```

Pixel level remapper 90 applies the remapping function P(x,k) to input frame I(i,j,k) to produce a contrast-enhanced frame C(i,j,k). For instance, when a lookup table is used to perform remapping, the following sequence of operations can be used to remap the input image:

```
for (i = 0; i < N; i++)
{
```

```
        for  (j = 0; j < M; j++)
            C[i][j] = Remap[I[i][j]];
    }
```

In FIG. 7, actual histograms generated during processing of a video frame are shown. Also shown is the output histogram O(x,k) measured on the contrast-enhanced frame C(i,j,k). Although the corresponding original frame I(i,j,k) and contrast-enhanced frame C(i,j,k) are also depicted in FIG. 7, it is not critical to an understanding of the invention that one discern from the figure any specific details about the frame itself.

Figure 8:
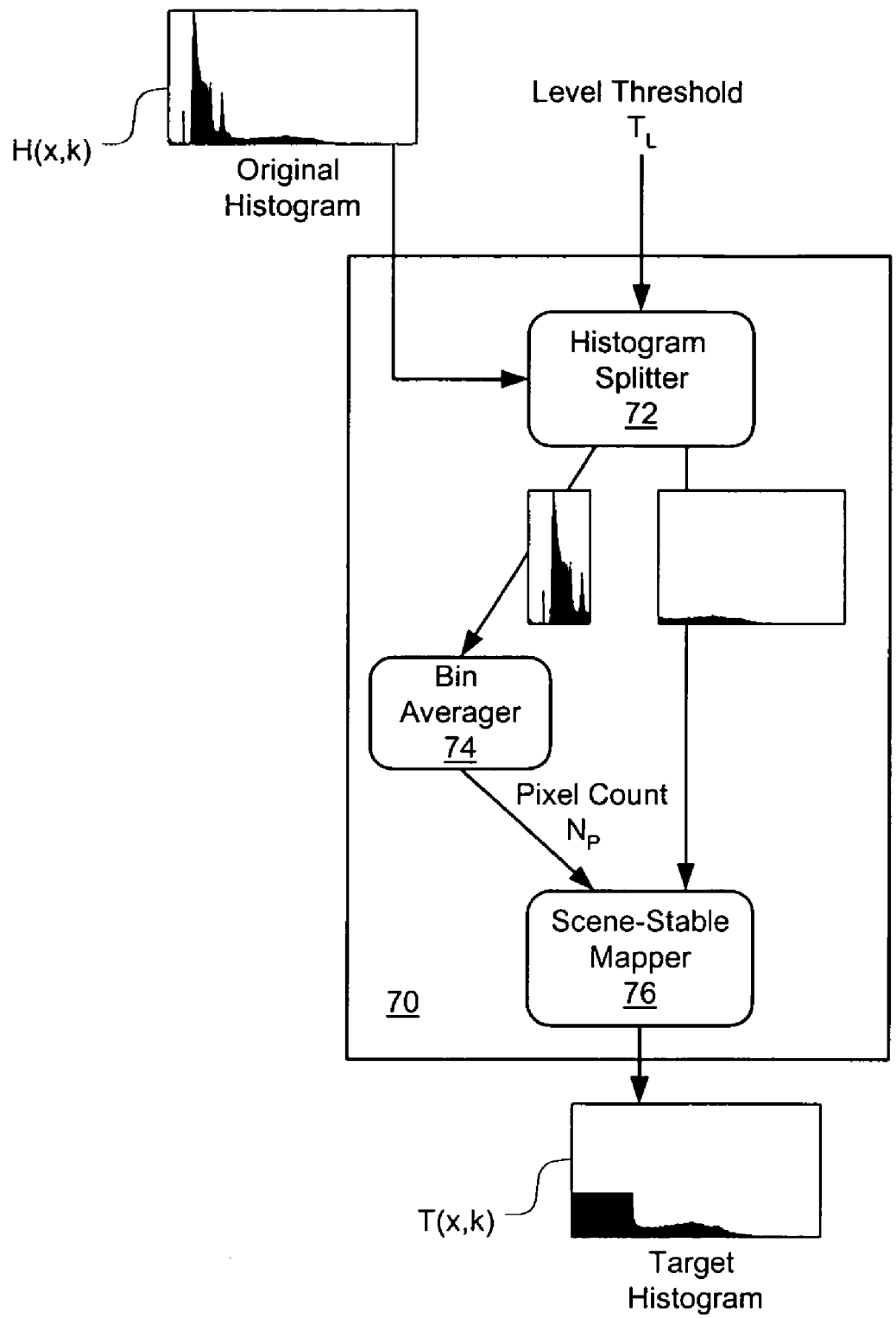
FIG. 8 depicts a block diagram for one embodiment of a target histogram calculator useful with the video contrast enhancer of FIG. 7.

FIG. 8 shows a block diagram for a target histogram calculator 70 as described above. Conceptually, histogram "splitter" 72 supplies the below-$T_L$ portion of the input histogram to bin averager 74 and the above-$T_L$ portion of the input histogram to scene-stable mapper 76. In an actual implementation, splitting may involve no more than supplying threshold $T_L$ and the complete histogram H(x,k) to both bin averager 74 and scene-stable mapper 76. These blocks can use threshold $T_L$ to access the portions of the input histogram needed for their operation.

Note that histogram splitter 72 can perform an additional function if the input threshold parameter is a percentage instead of an absolute level—splitter 72 can determine the absolute level from the percentage. For example, splitter 72 can perform the following search, where Tpercent is the percentage threshold.

PixelThresh=Tpercent*(N*M);
NumPixels=0;
for (T=0; PixelThresh>NumPixels; T++)
    NumPixels+=Hist[T];

Bin averager 74 produces an average pixels/bin figure $N_P$ to scene-stable mapper 76. Bin averager 74 can compute $N_P$ by summing the bin values for bins below $T_L$, and then dividing by the number of bins summed.

Scene-stable mapper 76 produces the target histogram T(x,k) in two steps. First, mapper 76 stores the value $N_P$ in each target histogram bin corresponding to a pixel intensity lower than $T_L$. For the remaining bins, mapper 76 stores H(x,k) in T(x,k).

Figure 9:
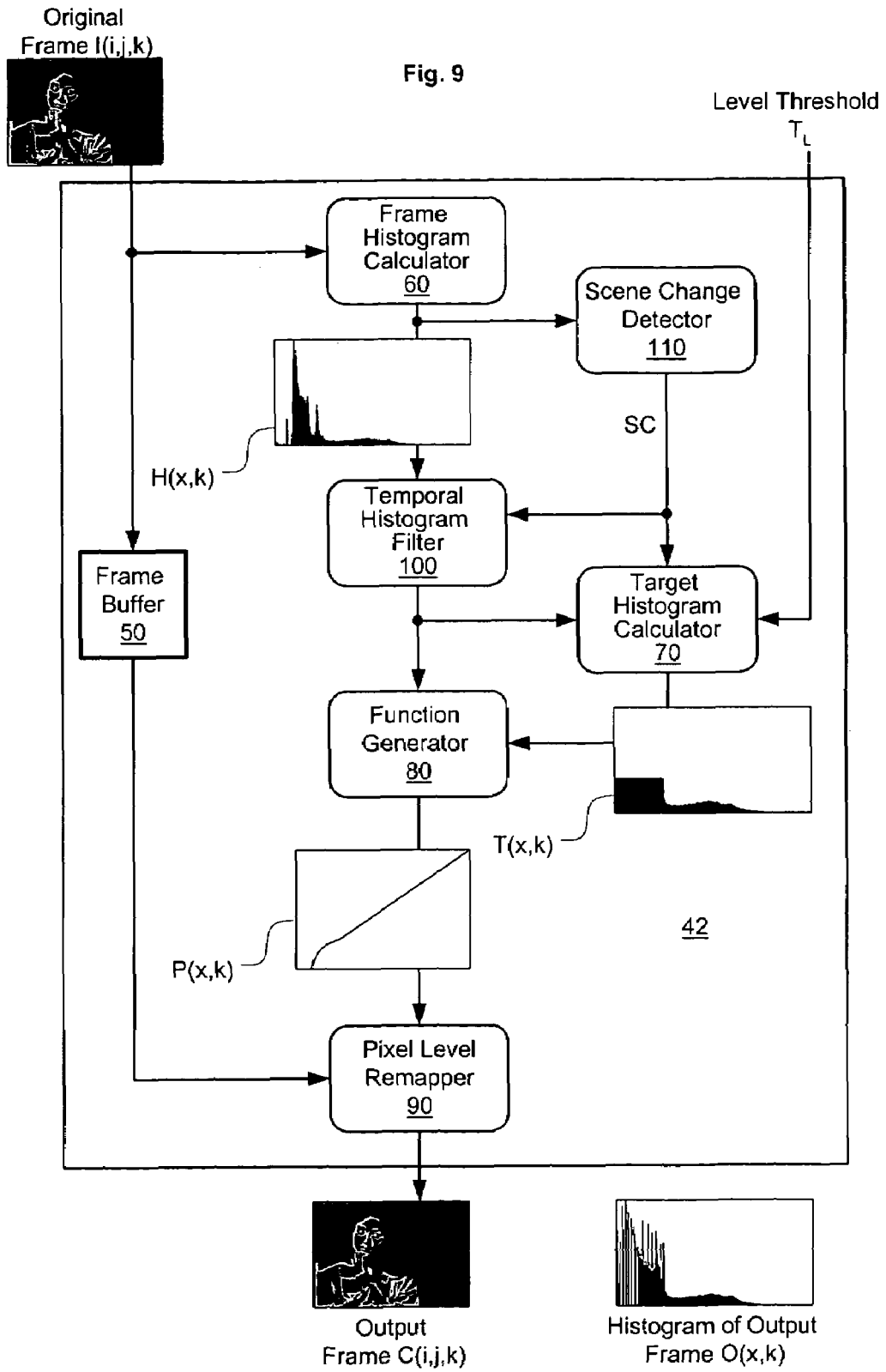
FIG. 9 shows an alternate video contrast enhancer embodiment employing a scene change detector.

In some embodiments, it may be preferable to have a temporal response characteristic that is slower than the single-frame contrast enhancement shown in FIG. 7. It may also be preferable to vary the temporal response characteristic depending on how quickly or slowly the scene is changing. FIG. 9 illustrates these concepts.

FIG. 9 shows two additional blocks 100 and 110 that do not exist in FIG. 7. Block 100 is a temporal histogram filter. Block 110 is a scene change detector. Each block can be used independent of the other, or they can operate together as shown.

Temporal histogram filter 100 supplies a weighted average of past frame histograms, instead of an instantaneous frame histogram, to target histogram calculator 70 and function generator 80. Since the weighted average should be a smoother function and change slower than the instantaneous histogram, the addition of filter 100 adds additional stability to the adaptive contrast-enhancing function.

Figure 10:
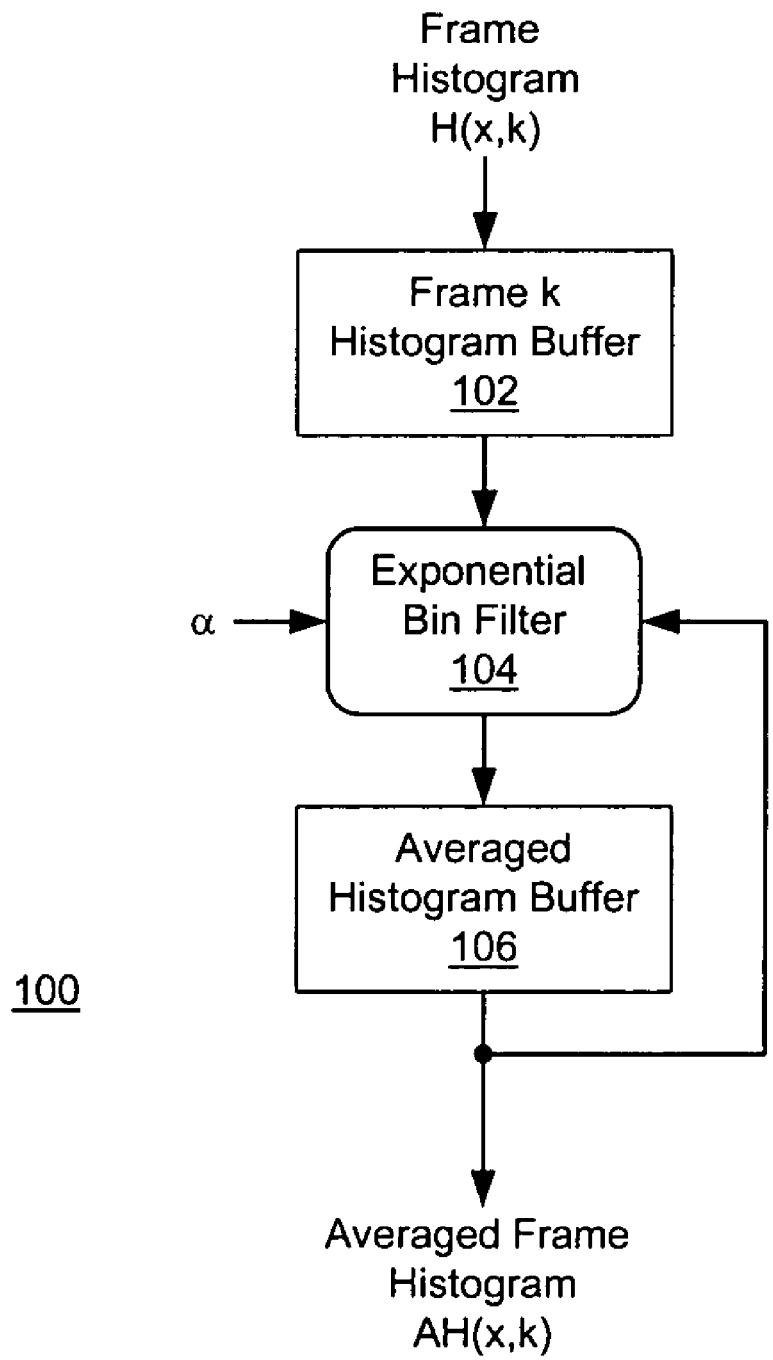
FIG. 10 contains a block diagram for a histogram averager useful with various embodiments of the invention.

FIG. 10 shows one possible configuration for temporal histogram filter 100. Frame histogram calculator 60 writes the instantaneous frame histogram for frame k into buffer 102. Buffer 106 contains the averaged histogram from frame k−1. Exponential bin filter 104 updates the contents of each bin of buffer 106, using a supplied time constant α, according to the following operations:

for (i=0; i<=MaxLevel; i++)
    AvgHist[i]=AvgHist[i]+α*(Hist[i]−AvgHist[i]);

Note that α need not be a constant. For instance, at detected scene changes, α can be set equal to 1.0 for one or two frames, in effect causing the instantaneous histogram to be copied into the average histogram buffer 106. In successive frames, α can be returned gradually (or in one step) to a much lower steady-state value.

Returning to FIG. 9, scene change detector 110 can be employed to detect how much the scene changes between successive frames. Although sophisticated scene analysis tools could be employed in detector 110, the kind of scene changes that a contrast enhancer cares about are generally not motion, but wholesale changes in the intensity distribution of the pixels in successive frames. Viewed from this standpoint, comparisons of successive frame histograms can generally be used in such a detector. For instance, scene change detector 110 can calculate a smoothed version of the current frame histogram (e.g., by mean-filtering across the bins or down-sampling). The smoothed versions of the current frame histogram and the preceding frame histogram can then be differenced. Statistics gathered from the difference histogram, such as average difference/bin, can then be used to make a scene change decision. When the differences indicate that the intensity distribution has changed substantially, the signal SC can be asserted.

As discussed above, the scene change signal SC can be used by temporal histogram filter 100 to adjust α. Target histogram calculator 70 can also use SC if such is desired. For instance, if changes to the scene-stable mapping function are to be made, such changes can be constrained to take place when SC is asserted.

To illustrate the performance of the present invention, a 256-gray-level sample video sequence was processed via four different approaches. The first approach was classic histogram equalization. The second approach followed the prior art BBHE algorithm. The third approach was frame-by-frame contrast enhancement according to an embodiment of the invention, with a threshold set at 50% of the input histogram. A shorthand name for this embodiment is PHE-P50 (Partial Histogram Equalization, 50% of pixels threshold). The fourth approach was like the third, but with the threshold fixed at a gray level of 64. A shorthand name for this embodiment is PHE-L64 (PHE, Level 64 threshold).

Figure 11:
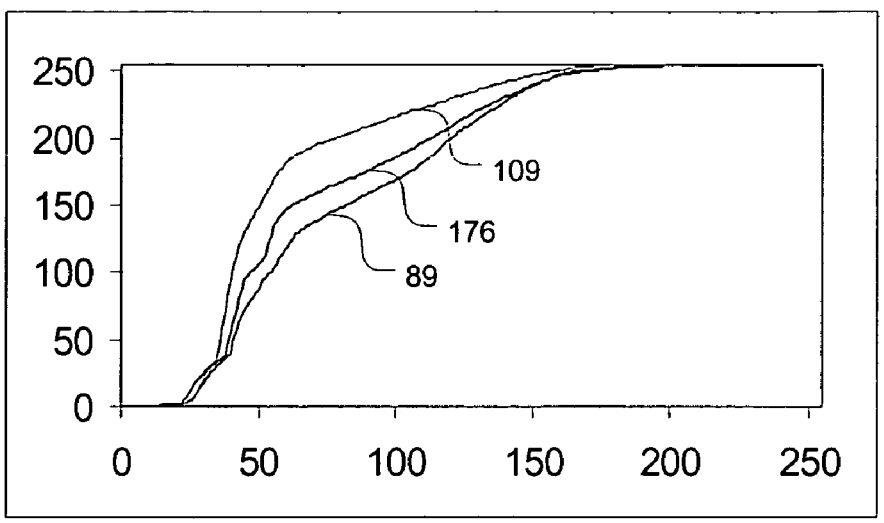
FIGS. 11, 12, and 13 each compare remapping functions obtained at three frames of a video sequence—FIG. 11 for the prior art BBHE approach, and FIGS. 12 and 13 for two embodiments of the present invention.
Figure 12:
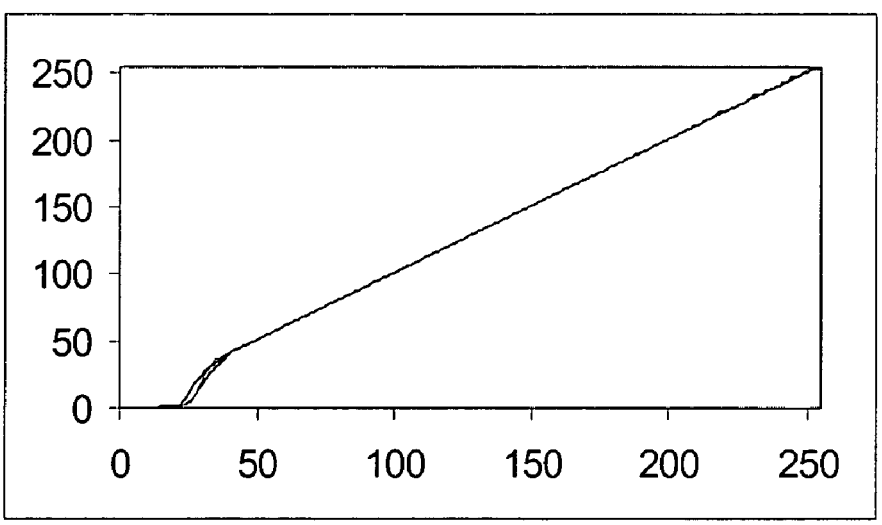
Figure 13:
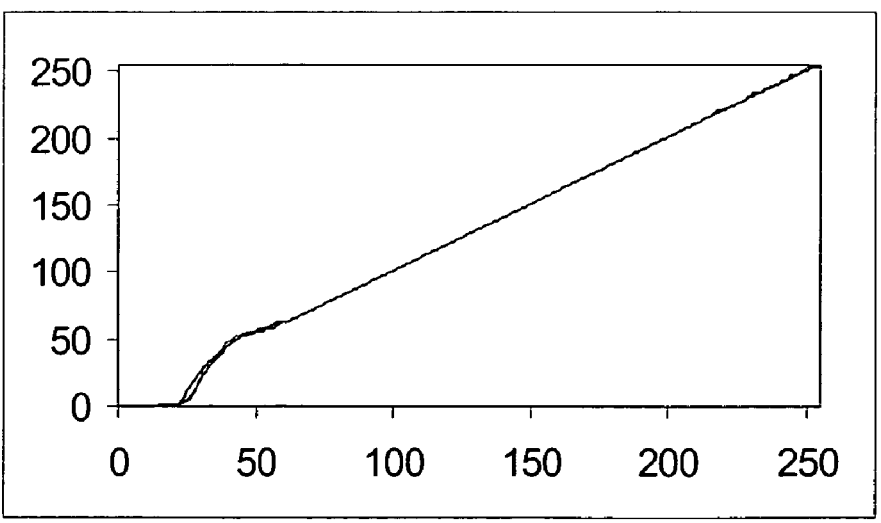

FIGS. 11, 12, and 13 correspond respectively to BBHE, PHE-P50, and PHE-L64. Each figure contains three plots of remapping curves—these correspond to the remapping curves applied respectively at frame 89, frame 109, and frame 176 of the sample video sequence. FIG. 11 shows that with BBHE, the mapping function applied to the video sequence fluctuates considerably. For instance, at frame 89, an input gray level of 50 maps to an output gray level of about 80; a second later, this same gray level maps to an output gray level of about 150. The brightness fluctuation implied by the remapping curves of FIG. 11 is clearly visible in the processed video.

FIGS. 12 and 13 show that for the same three-frame comparison, both PHE embodiments produced only small temporal differences in the remapping function.

Figure 14:
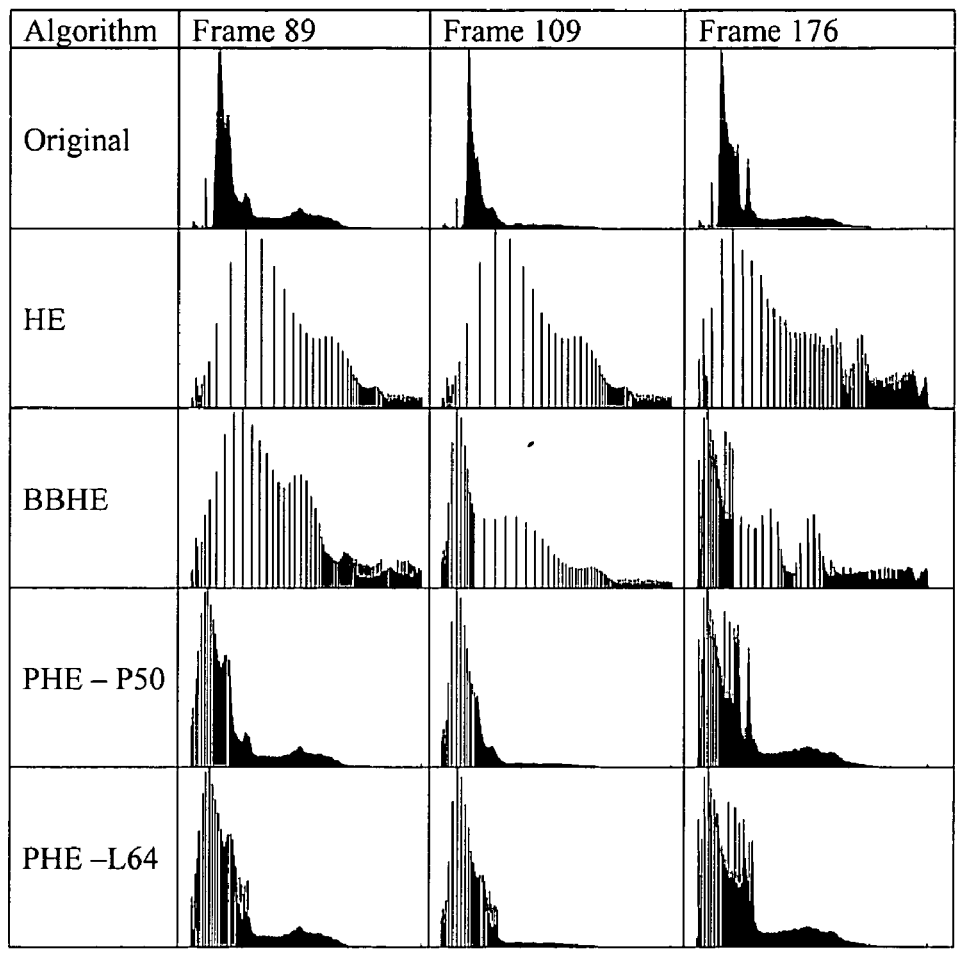
FIG. 14 shows frame histograms corresponding to the remapping functions of FIGS. 11, 12, and 13.

FIG. 14 compares input histograms to output histograms for frames 89, 109, and 176, for each of the four tested methods. For both PHE methods, it can be appreciated that the output histograms generally resemble the input histograms, but with better utilization of the lowest range of intensities.

Figure 15:
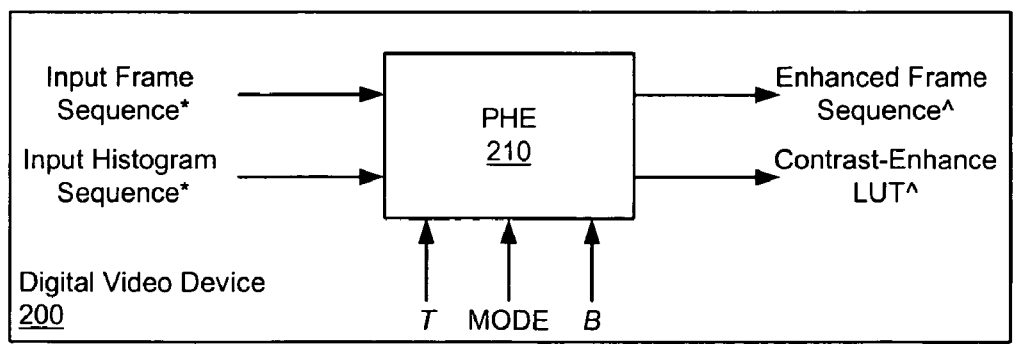
FIG. 15 shows the deployment of a video contrast enhancer according to the present invention within a digital video device.

The present invention is useful in many different types of digital video devices. FIG. 15 shows a general block diagram of a digital video device 200, including the elements necessary to implement and control a partial-histogram contrast enhancer 210. To represent the image sequence to be contrast-enhanced, device 200 supplies a digital input frame sequence and/or a corresponding frame histogram sequence to PHE 210. The output of PHE 210 can be a contrast-enhanced image sequence and/or a LUT that can be used for such contrast enhancement. Some examples of the types of devices that can be implemented according to FIG. 15 include digital video cameras, analog-to-digital video transfer devices, digital video editing devices, digital video compressors (PHE before compression), digital video decompressors (PHE after decompression), digital video receivers, digital video playback devices such as digital video disk, digital video tape, and hard-disk recording/playback devices, and digital video display devices.

In device 200, PHE 210 is inserted in the digital video stream at an appropriate point for the device. Although PHE 210 could be permanently enabled, it is preferable that a MODE signal exist. The MODE signal serves at least as a means for enabling or bypassing PHE 210. Further, MODE can be used to select various modes of PHE operation, e.g., PHE-L, PHE-P, and/or PHE on one, the other, or both ends of the histogram, filtered, unfiltered, various different target histogram specifications, etc.

It is also possible to fix a threshold T for PHE 210. Preferably, however, an input T provides a means for adjusting the threshold T. This input could be auto-selected from an examination of the input histogram. It could also be a manual input made available to the user.

For efficiency purposes, a brightness input B can also be implemented. Since PHE 210 already performs an intensity remapping, it is straightforward to have PHE 210 incorporate brightness remapping as well. For instance, T in the frame histogram can map to T+B in the target histogram. This can be accomplished via a simple modification to the target histogram operations already presented for target histogram calculator 70:

```
for  (i = 0; i < T; i++)
    SumHist += Hist [i];
SumHist /= T + B;
for  (i = 0; i < T + B; i++)
    Target[i] = SumHist;
for  ( j = i + B; (i <= MaxLevel)&&(j <= MaxLevel); )
    Target[i++] = Hist[j++];
```

The above algorithm does not check for a negative or zero value of T+B, but if such is a possibility, it can be addressed by mapping all bins greater than −B to bin 0 in the target histogram.

It is also recognized that various components of PHE block could be implemented elsewhere, either in device 210 or in another device. For instance, calculation of a frame histogram requires a large percentage of the clock cycles required to implement PHE, but the frame histogram itself is relatively small. Thus a capture or recording device could pre-calculate such a histogram and store/transmit it along with (or a frame ahead of) the actual frame data. Such an approach could reduce or eliminate any need for PHE frame buffering, and would greatly simplify receiver complexity in a single capture device/multiple playback device scenario. Likewise, a remapping LUT could be calculated in one device and transmitted to a downstream device for actual LUT transformation—such an approach could be beneficial if an intermediate compression step is more efficient with non-contrast enhanced frame data, but it is not desirable to implement PHE at the downstream device. The frame buffer may not be necessary in any circumstance, if it is determined that a short (e.g. 1-frame) lag in adaptive contrast enhancement does not cause visible artifacts.

The above embodiments have focused on monochromatic video. The embodiments can be modified to work with other color spaces as well. For instance, the luminance component of a color video sequence can be used to calculate a contrast-enhancing LUT for that sequence.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of video contrast enhancement comprising:
    setting a first pixel level threshold for an input video frame in a video sequence, the input video frame including a plurality of pixels having corresponding pixel values within a pixel value range, where the first pixel level threshold is set to one of the pixel values within the pixel value range;
    when a given input-video-frame pixel's value is below the pixel level threshold, remapping that pixel according to an adaptive contrast-enhancing function;
    when the given input-video-frame pixel's value is above the pixel level threshold, remapping that pixel according to a scene-stable mapping function;
    detecting substantial changes in scene histogram content from one frame of the video sequence to a following frame; and
    when a substantial change in scene histogram content is detected, allowing the adaptive contrast-enhancing function to change more rapidly than it is otherwise allowed to change.

2. The method of claim 1, further comprising:
    setting a second pixel level threshold for an input video frame, the second threshold higher than the first; and
    when a given input-video-frame pixel's value is above the second pixel level threshold, remapping that pixel to a new level according to a second adaptive contrast-enhancing function.

3. The method of claim 1, wherein setting a first pixel level threshold comprises setting a threshold that places a selected percentage of the input video frame's pixels below the threshold.

4. The method of claim 3, wherein the threshold is estimated from pixel values obtained from one or more previous input video frames.

5. The method of claim 1, wherein setting a first pixel level threshold comprises setting the threshold to a fixed level for at least the duration of a scene.

6. The method of claim 1, further comprising calculating the adaptive contrast-enhancing function to remap an input histogram for pixels below the pixel level threshold to a new histogram specification.

7. The method of claim 6, wherein the new histogram specification is a uniform distribution.

8. The method of claim 6, further comprising tabulating the input histogram from the pixels of the input video frame.

9. The method of claim 6, further comprising tabulating the input histogram from the pixels of one or more previous input video frames in the video sequence.

10. The method of claim 9, wherein tabulating the input histogram comprises maintaining each bin of the input histogram by exponentially time-filtering a corresponding bin as calculated for sequential frame histograms, each frame histogram representing one frame in the video sequence.

11. The method of claim 6, wherein calculating the adaptive contrast-enhancing function is performed once for every input video frame.

12. The method of claim 6, wherein the adaptive contrast-enhancing function has a pixel level output range different than the range of input pixel levels below the pixel level threshold.

13. The method of claim 1, wherein remapping for pixels both below and above the first pixel level threshold comprises using a pixel's value as an index to read a value from a common lookup table that combines the adaptive contrast-enhancing function and the scene-stable remapping function.

14. The method of claim 1, further comprising, when a substantial change in scene content is detected, allowing the scene-stable remapping function to change substantially.

15. The method of claim 1, wherein the scene-stable mapping function remaps a pixel to an output level that is a linear function of that pixel's input level.

16. A video contrast enhancer comprising:
a contrast-enhancing function generator capable of accepting a target histogram specification and a set of histogram bins derived from one or more frames of a video sequence, the bins representing a histogram at least for pixel levels below a selected pixel level threshold, the function generator capable of generating a remapping function for input pixel levels below the threshold based on the target histogram specification and the set of histogram bins;
a scene-stable mapper to control the remapping function for input pixel levels above the threshold;
a histogram calculator capable of constructing a frame histogram for the input video frame;
a temporal histogram filter to supply the set of histogram bins for use by the contrast-enhancing function generator, each bin comprising an exponentially time-filtered combination of sequential frame histograms from the histogram calculator; and
a scene change detector capable of detecting scene chances based on a comparison of successive frame histograms from the histogram calculator and supplying a scene change signal when a scene change is detected in the video sequence, the temporal histogram filter applying a different time constant when the scene change signal is asserted.

17. The video contrast enhancer of claim 16, further comprising a pixel remapper capable of accepting a pixel level from an input video frame and outputting a corresponding remapped pixel level according to the remapping function.

18. The video contrast enhancer of claim 17, wherein the pixel remapper comprises a lookup table indexed by input pixel level, the lookup table supplying the remapped pixel level according to the remapping function.

19. The video contrast enhancer of claim 16, wherein the bins of the frame histogram are supplied to the contrast-enhancing function generator as the set of histogram bins.

20. The video contrast enhancer of claim 16, further comprising a threshold calculator to calculate the set threshold to correspond to a selected percentage of the pixels represented in the histogram bins.

21. The video contrast enhancer of claim 16, wherein the scene-stable mapper controls the remapping function to at least approximate a linear function of input pixel level.

22. The video contrast enhancer of claim 16, further comprising:
a histogram calculator capable of constructing a frame histogram for an input video frame;
a frame buffer capable of buffering an input video frame until a remapping function can be calculated for that frame; and
a pixel remapper capable of accepting a pixel level from the buffered input video frame and outputting a corresponding remapped pixel level according to the remapping function.

23. The video contrast enhancer of claim 16, wherein the contrast-enhancing function generator is also capable of generating a remapping function for input pixel levels above a second selected pixel level threshold higher than the first threshold, based on the target histogram specification and the set of histogram bins, and wherein the scene-stable mapper controls the remapping function for input pixel levels between the two thresholds.

* * * * *